US008098286B2

United States Patent
Nakakuki et al.

(10) Patent No.: US 8,098,286 B2
(45) Date of Patent: Jan. 17, 2012

(54) SHAKE CORRECTION CONTROL CIRCUIT AND IMAGE PICKUP APPARATUS PROVIDED WITH THE SAME

(75) Inventors: Toshio Nakakuki, Mizuho (JP); Tomofumi Watanabe, Gifu (JP)

(73) Assignees: Semiconductor Components Industries, LLC, Phoenix, AZ (US); Sanyo Semiconductor Co., Ltd., Gunma (JP)

( * ) Notice: Subject to any disclaimer, the term of this patent is extended or adjusted under 35 U.S.C. 154(b) by 449 days.

(21) Appl. No.: 12/340,181

(22) Filed: Dec. 19, 2008

(65) Prior Publication Data

US 2009/0160952 A1 Jun. 25, 2009

(30) Foreign Application Priority Data

Dec. 19, 2007 (JP) ................................. 2007-327852

(51) Int. Cl.
*H04N 5/228* (2006.01)
(52) U.S. Cl. ............... 348/208.1; 348/208.5; 348/208.6; 348/208.99
(58) Field of Classification Search .... 348/208.1–208.8, 348/208.11–208.16, 208.99
See application file for complete search history.

(56) References Cited

U.S. PATENT DOCUMENTS

| 5,867,213 A | 2/1999 | Ouchi |
| 7,057,645 B1 | 6/2006 | Hara et al. |
| 2001/0022619 A1* | 9/2001 | Nishiwaki .................... 348/208 |
| 2006/0017813 A1* | 1/2006 | Okubo et al. ............. 348/208.2 |

FOREIGN PATENT DOCUMENTS

| JP | 7-123317 | 5/1995 |
| JP | 10-213832 | 8/1998 |
| JP | 2000-224470 | 8/2000 |

OTHER PUBLICATIONS

Korean Office Action, with English translation, issued in Korean Patent Application No. 10-2008-128950, dated Feb. 26, 2010.

* cited by examiner

*Primary Examiner* — Yogesh Aggarwal
(74) *Attorney, Agent, or Firm* — McDermott Will & Emery LLP

(57) ABSTRACT

An optical shake correction unit corrects an optical axis in response to an output signal of an vibration detecting element. An electronic shake correction unit adaptively varies an effective region in image signals of an image pickup region formed by image pickup devices. A control unit performs control such that either the optical shake correction unit or the electronic shake correction unit is enabled by switching between a first image pickup mode and a second image pickup mode.

8 Claims, 4 Drawing Sheets

SHAKE CORRECTION CONTROL CIRCUIT AND IMAGE PICKUP APPARATUS PROVIDED WITH THE SAME

CROSS-REFERENCE TO RELATED APPLICATIONS

This application is based upon and claims the benefit of priority from the prior Japanese Patent Application No. 2007-327852, filed on Dec. 19, 2007, the entire contents of which are incorporated herein by reference.

BACKGROUND OF THE INVENTION

1. Field of the Invention

The present invention relates to a shake correction control circuit provided with a function for correcting vibration such as one caused by camera shake, and an image pickup apparatus that includes said shake correction control circuit.

2. Description of the Related Art

Digital still cameras and digital movie cameras (hereinafter generically referred to as digital cameras) have been widely used by general users. Various methods for correcting camera shake are proposed for users who are not familiar with how to handle the cameras properly and therefore are likely to encounter camera shake when taking pictures. Among those digital cameras available, there is one, mounted on a portable telephone, which serves as one of functions in the portable telephone and a certain type of them are so designed that the camera is held by one hand only. In such devices operated by a thumb in one hand, the shake is more likely to occur as compared with commonly used cameras held by two hands to take pictures.

In order to correct such a shake, an optical shake correction and an electronic shake correction are in practical use, for instance. The optical shake correction is a method for correcting the optical axis by a vibration detecting element for detecting the vibration of a camera and a driver element that moves the position of a lens in such a direction as to cancel out the displacement caused by the vibration. The electronic shake correction is a method where the movement between adjacent image frames in moving images is identified by detecting the feature points or the like of the images and a cut-out position in an image pickup region is varied in such a manner as to cancel out the movement.

An advantageous aspect of the optical shake correction is that the correction can be done by using a single frame image only. On the other hand, a plurality of frames are required for the detection of any movement in the electronic shake correction and therefore the shake cannot be corrected if the shake occurs within a single frame. In the optical shake correction, a mechanical drive mechanism is required for the correction of the lens position which is problematic in terms of the electric power consumed.

Compared with the optical shake correction, the electronic shake correction has an advantageous aspect of being less power consuming. However, the correction is dependent on the frame rate. If the frame rate is low, highly accurate correction will be difficult to achieve in the electronic shake correction.

SUMMARY OF THE INVENTION

As described above, the optical shake correction and the electronic shake correction are in a trade-off relation to each other.

A shake correction control circuit according to one embodiment of the present invention comprises: an optical shake correction unit which corrects an optical axis in response to an output signal of an vibration detecting element; an electronic shake correction unit which adaptively varies an effective region in image signals of an image pickup region formed by image pickup devices; and a control unit which switches modes between a first image pickup mode and a second image pickup mode. The control unit performs control such that either optical shake correction unit or the electronic shake correction unit is enabled by switching between the first image pickup mode and the second image pickup mode.

BRIEF DESCRIPTION OF THE DRAWINGS

Embodiments will now be described by way of examples only, with reference to the accompanying drawings which are meant to be exemplary, not limiting, and wherein like elements are numbered alike in several Figures in which.

DETAILED DESCRIPTION OF THE INVENTION

The invention will now be described by reference to the preferred embodiments. This does not intend to limit the scope of the present invention, but to exemplify the invention.

Figure 1:
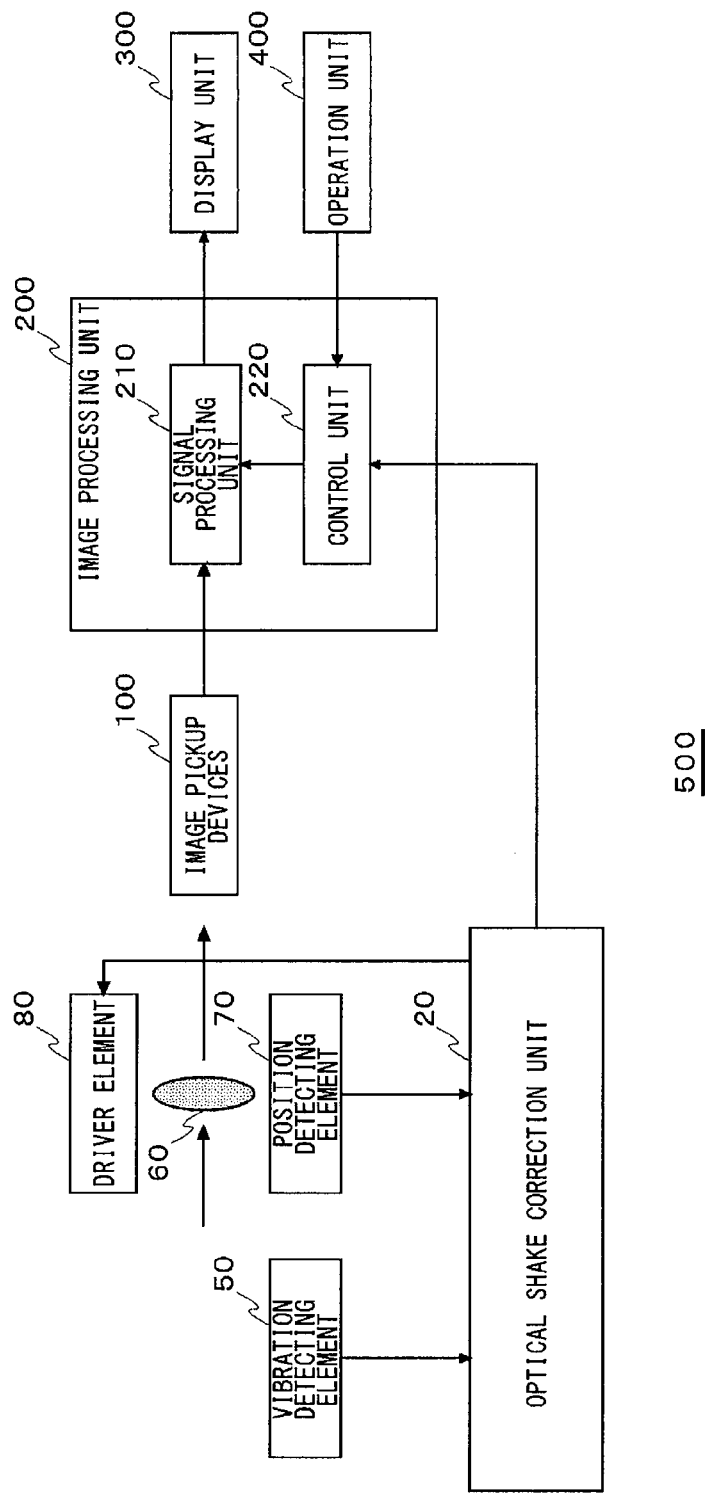
FIG. 1 is a block diagram showing a structure of an image pickup apparatus according to an embodiment of the present invention.

FIG. 1 is a block diagram showing a structure of an image pickup apparatus 500 according to an embodiment of the present invention.

The image pickup apparatus 500 includes a lens 60, a driver element 80, a position detecting element 70, a vibration detecting element 50, an optical shake correction unit 20, image pickup devices 100, an image processing unit 200, a display unit 300, and an operation unit 400.

The driver element 80 drives the lens 60. The position detecting element 70 detects the position of the lens 60. The vibration detecting element 50 detects the vibration applied to the image pickup apparatus 500.

The optical shake correction unit 20 corrects the position of the lens 60 by controlling the driver element 80 in response to an output signal of the vibration detecting element 50. The optical shake correction unit 20 obtains an amount of movement of the image pickup apparatus 500, as a signal with which to control the driver element 80, in response to the output signal of the vibration detecting element 50, and generates a signal to correct this amount of movement. This signal may be supplied to a control unit 220 described later. A structure of the optical shake correction unit 20 will be described in detail later.

The image pickup devices 100 convert the light signals transmitted through the lens 60, into electric signals. The image pickup devices 100 may be CCD (charge-coupled device) sensors or CMOS (complementary metal-oxide semiconductor) image sensors.

The image processing unit 200 processes image signals outputted from the image pickup devices 100. For more specific structure, the image processing unit 200 includes a signal processing unit 210 and a control unit 220. These structural components may be implemented hardwarewise by elements such as a CPU, memory and other LSIs of an arbitrary computer, and softwarewise by memory-loaded programs having image processing functions or the like. Depicted herein are functional blocks implemented by cooperation of hardware and software. Therefore, it will be obvious to those skilled in the art that the functional blocks may be implemented by a variety of manners including hardware only, software only or a combination of both.

The control unit 220 controls the signal processing unit 210 in such a manner that image signals of a region to be set effective are cut out or extracted from image signals of an image pickup region formed by the image pickup devices 100. When the electronic shake correction is used, an image pickup region having the number of pixels larger than effective pixels of an image to be displayed or recorded is set. The aforementioned cutting-out or extraction of the image signals of a region to be set effective may be a processing where the image signals of a region to be used are made effective and those of unused regions are invalidated out of the actually captured image signals. Also, the aforementioned cutting-out of the image signals of a region to be set effective may be a processing where, among a plurality of image pickup devices that form the image pickup region, image pickup devices for a region to be used are made effective and those for unused region are invalidated.

The control unit 220 switches the image pickup mode. For instance, there are moving image pickup mode and still image pickup mode. Such modes can be specified based on a user operation via the operation unit 400. For instance, when a shutter button, for use in still image capture, contained in the operation unit 400 is pressed down while a camera is initially in the moving image pickup mode, the still image pickup mode is specified. It is to be noted that the still image pickup mode may include a continuous shooting mode. The moving image pickup mode may be a case where moving images are captured with the purpose of recording them actually or a case where the recording of the moving images is not intended but a preview is displayed on the display unit 300 prior to the capture of still images. Further, the switching of the image pickup mode may be the switching from the moving image pickup mode (no recording intended) to the moving image pickup mode with the purpose of recording them. In short, the image pickup mode may be switched between a first image pickup mode and a second image pickup mode that differs from the first image pickup mode.

For example, when the image pickup mode is set to the moving image pickup mode, the control unit 220 performs control in such a manner that the processing of correcting the position of the lens 60 is disabled and the effective region is adaptively varied; and when the image pickup mode is set to the still image pickup mode, the control unit 220 performs control in such a manner that the signal processing unit 210 fixes the effective region and the above-described correction processing by the driver element 80 and the optical shake correction unit 20 is enabled. In other words, the electronic shake correction is employed in the moving image pickup mode, whereas the optical shake correction is employed in the still image pickup mode.

When the signal processing unit 210 receives a signal with which to correct the amount of movement of the image pickup apparatus 500 in the moving image pickup mode from the optical shake correction unit 20, the signal processing unit 210 can vary the region to be cut out, based on this signal. That is, the effective region is moved in an opposite direction to cancel out the amount of movement. It is to be noted that the method for acquiring the amount of movement of the image pickup apparatus 500 is not limited to a method for acquiring it from the optical shake correction unit 20 and, for example, the amount of movement thereof may be estimated by tracking the feature points between neighboring images.

The display unit 300 displays images based on the image signals cut out by the signal processing unit 210. The control unit 220 may have the display unit 300 display the moving images picked up in the moving image mode as a preview prior to the still image pickup mode.

When the mode is switched from the still image pickup mode to the moving image pickup mode, the control unit 220 moves the effective region in the image pickup region to a center. As described above, the effective region is adaptively moved in the image pickup region and therefore when the mode is switched from the still image pickup mode to the moving image pickup mode, it is recommended that the effective region is moved to the center as initial processing. As a result, the effective region is initialized to the position where a correction range is maximum in the playback of moving image shooting.

Figure 2:
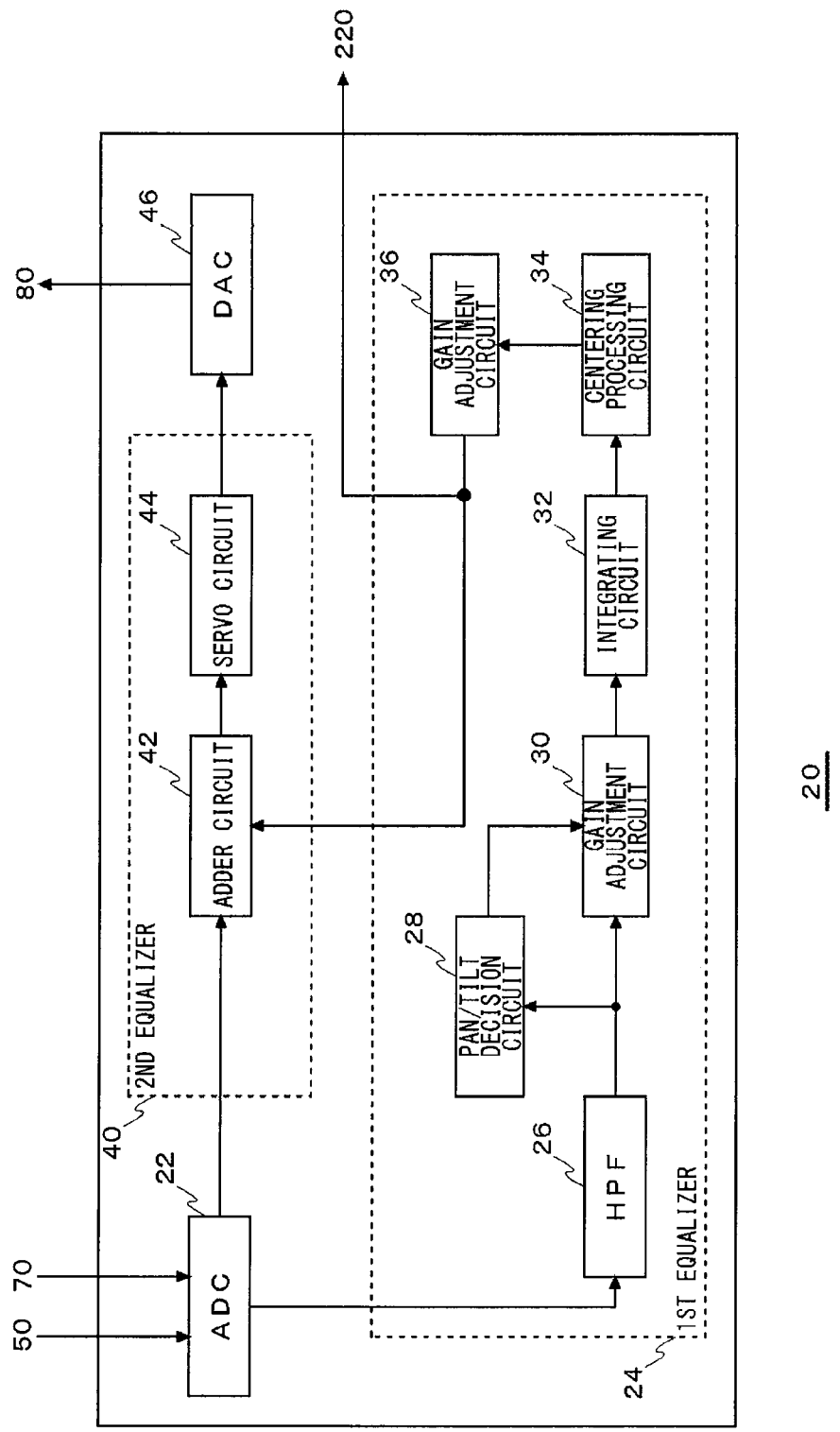
FIG. 2 shows a structure of an optical shake correction unit according to an embodiment of the present invention.

FIG. 2 shows a structure of the optical shake correction unit 20 according to an embodiment of the present invention.

The optical shake correction unit 20 includes a first equalizer 24, a second equalizer 40, an ADC (analog-to-digital converter) 22 and a DAC (digital-to-analog converter) 46.

The first equalizer 24 includes an HPF (high-pass filter) 26, a pan/tilt decision circuit 28, a gain adjustment circuit 30, an integrating circuit 32, a centering processing circuit 34, and a gain adjustment circuit 36. The second equalizer 40 includes an adder circuit 42 and a servo circuit 44.

A concrete description is given hereunder of a structure and an operation of the optical shake correction unit 20.

The vibration detecting element 50 can be a gyro sensor 50a. The optical shake correction unit 20 is hereinbelow described using an example where the gyro sensor 50a is used. It is assumed herein that the acceleration caused by a user holding the image pickup apparatus 500 is detected as angular velocity. The position detecting element 70 may be a hall element 70a. The optical shake correction unit 20 is hereinbelow described using an example where the hall element 70a is used. The driver element 80 may be a voice coil motor (VCM) 80a. The optical shake correction unit 20 is hereinbelow described using an example where the VCM 80a is used.

The gyro sensor 50a detects the angular velocities in two-axis (X-Y) directions of the image pickup apparatus 500. After an analog angular velocity signal obtained by the gyro sensor is amplified by a not-shown amplifier circuit, the amplified signal is outputted to the ADC (analog-to-digital converter) 22. The ADC 22 converts the angular velocity signal amplified by the amplifier circuit into a digital angular velocity signal. The angular velocity signal outputted from the ADC 22 is outputted to the first equalizer 24.

In the first equalizer 24, the digital angular velocity signals outputted from the ADC 22 are first inputted to the HPF (high-pass filter) 26. Out of the angular velocity signals outputted from the gyro sensor 50a, the HPF 26 removes frequency components thereof lower than the frequency components due to the camera shake. In general, the frequency components due to the camera shake lie in the range of 1 to 20 Hz, so that those less than or equal to 0.7 Hz, for instance, are removed from the angular velocity signals.

The pan/tilt decision circuit 28 detects a pan operation and a tilt operation of the image pickup apparatus 500, based on the angular velocity signal outputted from the HPF 26. When it is detected that the angular velocity signal continues to be greater than or equal to a predetermined threshold value for a certain period of time, the pan/tilt decision circuit 28 determines that the image pickup apparatus 500 is panning or tilting. Note that moving the image pickup apparatus 500 in the horizontal direction in response to the movement of an object or the like is called the pan operation whereas moving it in the vertical direction in response thereto is called the tilt operation.

The gain adjustment circuit 30 varies the gain of the angular velocity signal outputted from the HPF 26, according to the decision result of the pan/tilt decision circuit 28. For example, if the image pickup apparatus 500 is not panning or tilting, the gain adjustment circuit 30 will make such an adjustment as to maintain the strength of the angular velocity signal outputted from the HPF 26. If the image pickup apparatus 500 is panning or tilting, the gain adjustment circuit 30 will make adjustments so that the output of the HPF 26 becomes 0 by reducing the strength of the angular velocity signal outputted from the HPF 26.

The integrating circuit 32 integrates the angular velocity signals outputted from the gain adjustment circuit 30 so as to generate a vibration-component signal indicating the amount of movement of the image pickup apparatus 500. For example, the integrating circuit 32, which is preferably configured by including a not-shown digital filter, performs filtering processing according to a filter coefficient set by a not-shown register and thereby obtains an angular signal, namely the amount of movement of the image pickup apparatus 500.

When the shake correction processing is to be carried out in the image pickup apparatus 500, there are cases where as the correction processing continues to be carried out, the position of the lens 60 is gradually displaced away from a reference position and the position of the lens 60 eventually reaches a neighborhood of the limiting point of the lens movable range. In such a case, if the shake correction processing continues, the lens 60 can still further move in one direction but cannot move in the other direction. The centering processing circuit 34 is so provided as to prevent this.

The vibration-component signal outputted from the centering processing circuit 34 is adjusted by the gain adjustment circuit 36 to the range of the output signals of the hall element 70a. The vibration-component signal adjusted by the gain adjustment circuit 36 is outputted to the second equalizer 40.

The hall element 70a, which is a magnetic sensor using the Hall effect, functions as a position detecting element that detects the position in the X and Y directions of the lens 60. An analog positional signal containing the positional information on the lens 60 obtained by the hall element 70a is amplified by the not-shown amplifier circuit and is then outputted to the ADC 22. The ADC 22 converts the analog positional signal amplified by this amplifier circuit into a digital positional signal. Note that the ADC 22 converts the aforementioned analog angular velocity signal and analog positional signal into their digital signals in a time sharing manner.

The positional signal outputted from the ADC 22 is outputted to the second equalizer 40. In the second equalizer 40, the positional signal outputted from the ADC 22 is first inputted to the adder circuit 42. The vibration-component signal adjusted by the gain adjustment circuit 36 is inputted to the adder circuit 42. The adder circuit 42 adds up the inputted positional signal and the vibration-component signal. A signal outputted from the adder circuit 42 is outputted to the servo circuit 44. In response to the output signal from the adder circuit 42, the servo circuit 44 generates a signal used to control the drive of the VCM 80a. Note that a filtering processing using a servo-control digital filter may be executed in the servo circuit 44.

A VCM drive signal outputted from the servo circuit 44 is converted into an analog signal from a digital signal by the DAC (digital-to-analog converter) 46. The analog VCM drive signal is amplified by the not-shown amplifier circuit and then the thus amplified analog VCM drive signal is outputted to the VCM 80a. The VCM 80a moves the position of the lens 60 in the X and Y directions, based on the VCM drive signal.

A description is now given of operations of the image pickup apparatus 500 according to the present embodiment when there is no camera shake and when there is a camera shake, respectively.

(Operation when there is No Shake)

Where no shake occurs, no angular velocity is produced in the image pickup apparatus 500, so that the signal outputted from the first equalizer 24 is "0". The lens 60 to be driven by the VCM 80a lies in such a position that the optical axis thereof agrees with the center of the image pickup devices 100 provided in the image pickup apparatus 500. Hence, the analog positional signal from the hall element 70a is converted by the ADC 22 into a digital positional signal indicating "0" and then this digital positional signal is outputted to the second equalizer 40. As a result, the servo circuit 44 outputs a signal for controlling the VCM 80a in such a manner as to maintain the position of the current position of the lens 60.

If the optical axis of the lens 60 does not agree with the center of the image pickup devices 100, the analog positional signal from the hall element 70a will be converted by the ADC 22 into a digital positional signal indicating a value different from "0" and then this digital positional signal will be outputted to the second equalizer 40. In response to the digital positional signal outputted from the ADC 22, the servo circuit 44 controls the VCM 80a so that the value of the positional signal becomes "0".

By repeating such an operation as described above, the position of the lens 60 is controlled so that the optical axis of the lens 60 agrees with the center of the image pickup devices 100.

(Operation when there is a Shake)

The lens 60 driven by the VCM 80a lies in such a position that the optical axis thereof agrees with the center of the image pickup devices 100 provided in the image pickup apparatus 500. Hence, the analog positional signal from the hall element 70a is converted by the ADC 22 into a digital positional signal indicating "0" and then this digital positional signal is outputted to the second equalizer 40.

At the same time, since the image pickup apparatus 500 is moved as a result of the shake, the integrating circuit 32 and the centering processing circuit 34 output a vibration-component signal indicating an amount of movement of the image pickup apparatus 500, based on the angular velocity signal detected by the gyro sensor 50a.

The servo circuit 44 generates a drive signal of the VCM 80a according to the signal obtained by adding the positional signal indicating "0" outputted from the ADC 22 and the vibration-component signal outputted from the centering processing circuit 34. That is, although the positional signal indicates "0", the vibration-component signal which is not equal to "0" is added, so that the servo circuit 44 generates a correction signal with which to move the lens 60.

The camera-shake correction employed in the present embodiment is not a so-called electronic shake correction which is performed in such a manner that the image signals outputted from the image pickup devices are once loaded into memory and a camera-shake factor determined as a result of the comparison with the next image is removed. Instead, the camera-shake correction employed in the present embodiment is an optical shake correction such as a lens-shift method where the lens is shifted optically, as described above.

Thus, the optical shake correction can resolve a problem to be solved in a case when a electronic shake mechanism is employed, namely the problem concerning the reduction in image quality caused when an image of relatively large size which has been extracted beforehand is trimmed. Also, the optical shake correction can resolve a problem to be solved concerning the restriction imposed on the correction range or image pickup magnification due to the constraint of the size of image pickup devices such as the size of CCDs. Further, the optical shake correction can resolve a problem to be solved where the camera shake cannot be corrected if it occurs within each frame. Accordingly, the use of optical shake correction according to the present embodiment has such advantageous effects as those described above. In particular, when still images are to be extracted from the high-quality video images, the optical shake correction is effective.

The VCM 80*a* moves the lens 60 based on the correction signal outputted from the servo circuit 44, so that the image pickup devices 100 can obtain signals suppressing the displacement of an object due to a camera shake. Camera-shake correction control can be achieved by repeating such control as described above.

Figure 3:
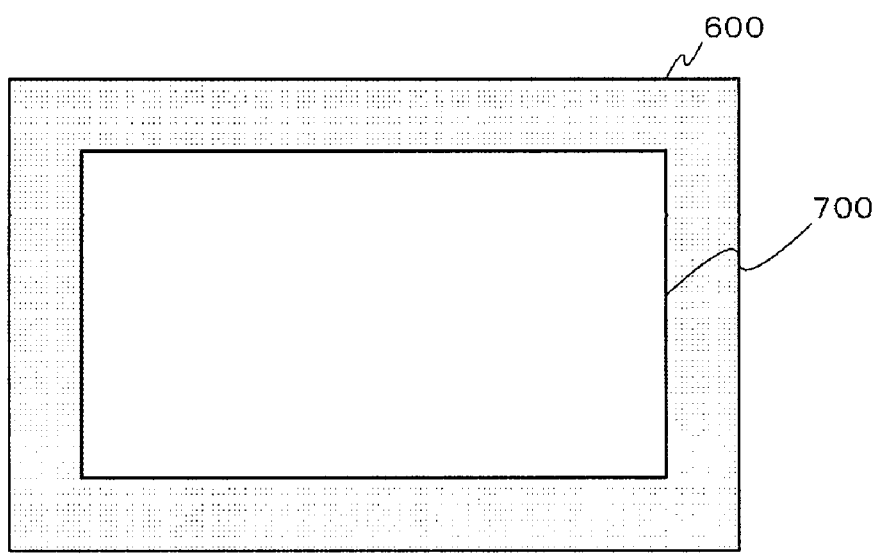
FIG. 3 shows an image pickup region and an effective region in a still image pickup mode according to an embodiment of the present invention.

FIG. 3 shows an image pickup region 600 and an effective region 700 in the still image pickup mode according to an embodiment. In the still image pickup mode, it is preferable that the effective region 700 of the image signal outputted from the signal processing unit 210 to the display unit 300 or a not-shown encoder and the like be an effective region of the last moving image frame at the time when the moving image pickup mode is switched to still image pickup mode. In other words, the optical shake correction is carried out in this mode. As a result, the displacement of effective regions in between moving images and still image is unlikely to occur.

Figure 4:
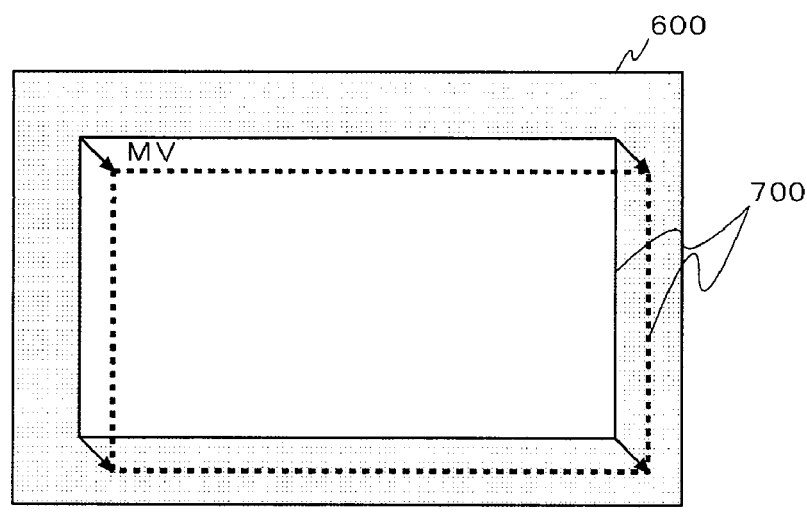
FIG. 4 shows an image pickup region and an effective region in a moving image pickup mode according to an embodiment of the present invention.

FIG. 4 shows an image pickup region 600 and an effective region 700 in the moving image pickup mode according to an embodiment. In the moving image pickup mode, the effective region 700 outputted from the signal processing unit 210 is adaptively varied based on the information, on the amount of movement of the image pickup apparatus 500, supplied from the optical shake correction 20 (this information being depicted as a moving vector MV in FIG. 4). That is, the electronic shake correction is carried out in this mode.

According to the present embodiments as described above, the electronic correction is used in the moving image pickup mode, whereas the optical correction is used in the still image pickup mode. Hence, vibration like camera shake can be corrected highly accurately with low power consumption. Also, when the electronic correction is to be carried out, the information, on the amount of movement, analyzed by the optical shake correction unit 20 is used. As a result, the amount of computation required for the image processing can be reduced. In other words, the computation otherwise necessary for estimating motions by comparing the features points and the like between images can be skipped.

In particular, the present embodiments are effective when applied to the previewing prior to a still image shooting. Although there are cases where the electronic correction does not assure enough accuracy, the electronic correction is sufficient for the correction used for the previewing purpose. Since this previewing does not require the use of the driver element 80, the power consumption can be reduced and this advantageous effect surpasses the aforementioned shortcoming.

The present invention has been described based upon illustrative embodiments. These embodiments are intended to be illustrative only and it will be obvious to those skilled in the art that various modifications to the combination of constituting elements and processes could be developed and that such modifications are also within the scope of the present invention.

In the above-described embodiments, the gyro sensor, the hall element and the voice coil motor function as the vibration detecting element 50, the position detecting element 70 and the driver element 80, respectively, but these should not be considered as limiting. For example, a structure may be such that the vibration detecting element 50 detects the vibration of the image pickup apparatus 500, based on an acceleration signal, by the use of a sensor for detecting the acceleration in the rectilinear direction. A piezo element, a stepping motor or the like may be used for the driver element 80. An MR element, a photo screen diode or the like may be used for the position detecting element 70.

The above-described embodiments have been described using an example where the mode is switched from the moving image pickup mode to the still image pickup mode. However, the correction method may be switched between the electronic shake correction and the optical shake correction when the image pickup mode is switched from the first mode to the second mode that differs from the first mode. Also, even if the shooting mode is set to a predetermined mode and no switching seems necessary, a structure may be configured such that the electronic shake correction and the optical shake correction is selectable by the user. Further, a state where the electronic shake correction only is selected and a state where both the optical shake correction and the electronic shake correction are selected may be switched therebetween. Selecting the both can raise the accuracy in shake correction.

While the preferred embodiments of the present invention have been described using specific terms, such description is for illustrative purposes only, and it is to be understood that changes and variations may be further made without departing from the spirit or scope of the appended claims.

What is claimed is:

1. A shake correction control circuit, comprising:
an optical shake correction unit which corrects an optical axis in response to an output signal of an vibration detecting element;
an electronic shake correction unit which adaptively varies an effective region in image signals of an image pickup region formed by image pickup devices; and
a control unit which switches modes between a first image pickup mode and a second image pickup mode,
wherein said control unit performs control such that either said optical shake correction unit or said electronic shake correction unit is enabled by switching between the first image pickup mode and the second image pickup mode, and
said control unit moves the effective region to a center when the mode is switched from the second image pickup mode in which the optical shake correction unit is enabled to the first image pickup mode in which the electronic shake correction unit is enabled.

2. A shake correction control circuit according to claim 1, wherein said electronic shake correction unit varies adaptively the effective region in response to the output signal of the vibration detecting element.

3. A shake correction control circuit according to claim 2, wherein said optical shake correction unit generates a vibration-component signal indicating an amount of movement of an image pickup apparatus, in response to the output signal of the vibration detecting element, and wherein said electronic shake correction unit varies the effective region based on the vibration-component signal received from said optical shake correction unit.

4. A shake correction control circuit according to claim 1, wherein the first image pickup mode is a moving image pickup mode, and the second image pickup mode is a still image pickup mode.

5. A shake correction control circuit according to claim 2, wherein the first image pickup mode is a moving image pickup mode, and the second image pickup mode is a still image pickup mode.

6. A shake correction control circuit according to claim 3, wherein the first image pickup mode is a moving image pickup mode, and the second image pickup mode is a still image pickup mode.

7. A shake correction control circuit according to claim 1, wherein the moving image pickup mode is a mode where moving images are picked up to display a preview prior to the pickup of a still image.

8. A image pickup apparatus including a shake correction control circuit according to claim 1.

* * * * *